US008845050B2

(12) United States Patent
Matsui et al.

(10) Patent No.: US 8,845,050 B2
(45) Date of Patent: Sep. 30, 2014

(54) THREE-DIMENSIONAL MODELING APPARATUS, CONTROL APPARATUS, CONTROL METHOD, AND THREE-DIMENSIONAL OBJECT

(75) Inventors: Takeshi Matsui, Tokyo (JP); Junichi Kuzusako, Saitama (JP); Hiroyuki Yasukochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 371 days.

(21) Appl. No.: 12/707,898

(22) Filed: Feb. 18, 2010

(65) Prior Publication Data
US 2010/0214333 A1 Aug. 26, 2010

(30) Foreign Application Priority Data
Feb. 26, 2009 (JP) ................ P2009-044097

(51) Int. Cl.
B41J 25/308 (2006.01)
B29C 67/00 (2006.01)

(52) U.S. Cl.
CPC ........... *B41J 25/308* (2013.01); *B29C 67/0081* (2013.01)
USPC .................... 347/8; 347/19; 347/107; 419/65

(58) Field of Classification Search
USPC .................... 347/8, 19, 107; 419/65
See application file for complete search history.

(56) References Cited

U.S. PATENT DOCUMENTS 5,204,055 A * 4/1993 Sachs et al. .................. 419/2
6,084,980 A * 7/2000 Nguyen et al. .............. 382/154
2001/0050448 A1 * 12/2001 Kubo et al. ................. 264/308
2002/0029094 A1 * 3/2002 Koreishi ..................... 700/197
2005/0059757 A1 * 3/2005 Bredt et al. .................. 524/3

FOREIGN PATENT DOCUMENTS

| JP | 7507508 | 8/1995 |
| JP | 2004-090406 | 3/2004 |
| JP | 200768844 | 3/2007 |
| WO | 2007/077731 A1 | 7/2007 |

OTHER PUBLICATIONS

Japanese Office Action issued Apr. 23, 2013 for corresponding Japanese Appln. No. 2009-044097.

* cited by examiner

Primary Examiner — Uyen Chau N Le
Assistant Examiner — Chad Smith
(74) Attorney, Agent, or Firm — K&L Gates LLP

(57) ABSTRACT

A three-dimensional modeling apparatus includes a stage, a head, an adjustment mechanism, an ejection command means, and a control means. On the stage, a powder material is accumulated. The head ejects ink to the powder material on the stage. The adjustment mechanism adjusts a relative height of the stage and the head for each predetermined layer thickness so that a three-dimensional object is formed on the stage by the predetermined layer thickness. The ejection command means causes the ink to be ejected from the head so that the powder material is colored a plurality of colors corresponding to multilevel luminance information items in a multivalued image obtained by performing a multivalued processing of luminance with respect to a two-dimensional cross-sectional image data of a modeling target object. The control means controls the adjustment mechanism and the ejection command means so that the multivalued image is drawn for each layer thickness.

29 Claims, 16 Drawing Sheets

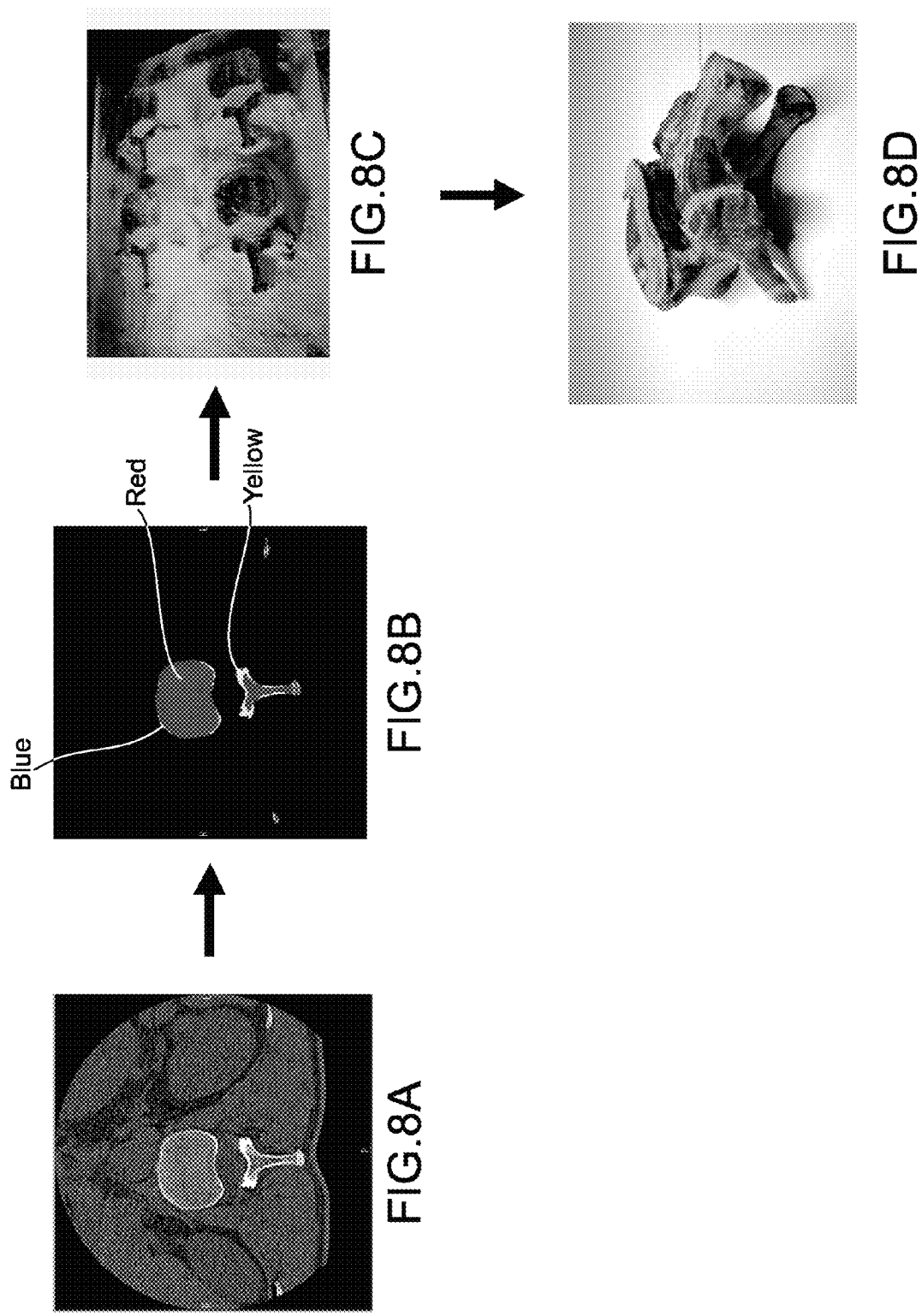

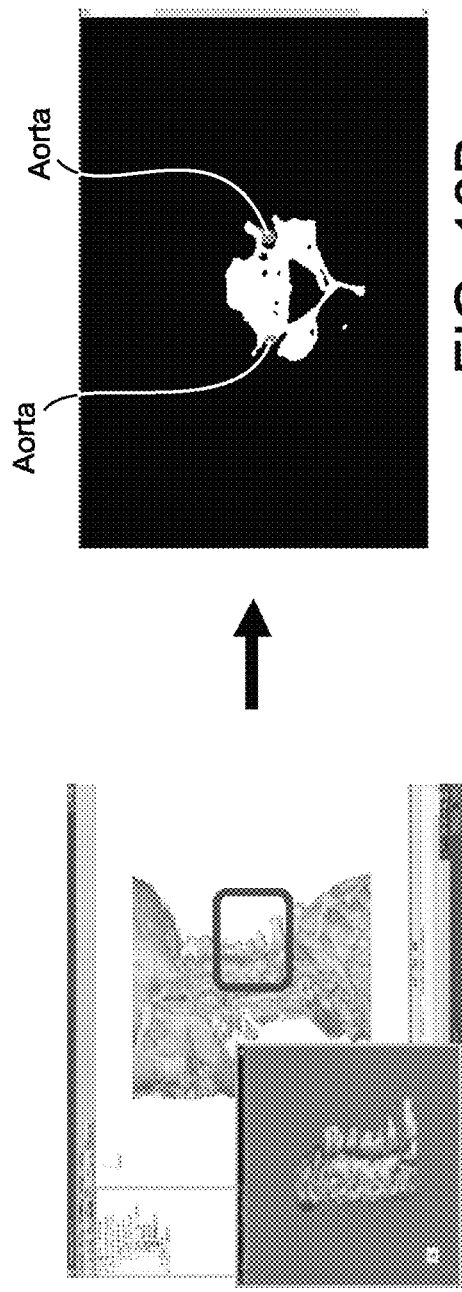
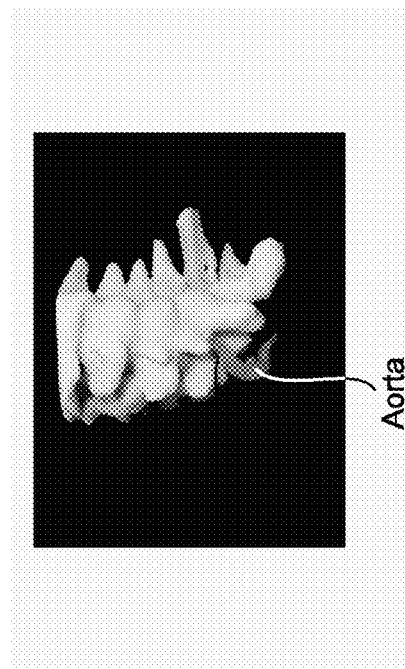
FIG. 12A
FIG. 12B
FIG. 12C

| Kind of color | Color set value (grayscale) | | | Optical density OD | | | | Brightness | Chromaticity | | Chroma |
|---|---|---|---|---|---|---|---|---|---|---|---|
| | Red | Blue | Green | V | C | M | Y | L* | a* | b* | c* |
| G1 | 0 | 0 | 0 | 1.15 | 1.13 | 1.19 | 1.23 | 31.50 | 2.86 | 4.49 | 5.32 |
| G32 | 31 | 31 | 31 | 1.02 | 1.02 | 1.02 | 0.98 | 36.84 | 1.65 | -2.99 | 3.42 |
| G64 | 63 | 63 | 63 | 0.82 | 0.79 | 0.82 | 0.78 | 45.60 | 4.63 | -3.74 | 5.95 |
| G96 | 95 | 95 | 95 | 0.61 | 0.58 | 0.62 | 0.59 | 56.17 | 5.37 | -2.54 | 5.94 |
| G128 | 127 | 127 | 127 | 0.43 | 0.41 | 0.43 | 0.43 | 67.04 | 4.00 | -1.14 | 4.16 |
| G160 | 159 | 159 | 159 | 0.30 | 0.29 | 0.30 | 0.31 | 75.68 | 2.30 | 0.04 | 2.30 |
| G192 | 191 | 191 | 191 | 0.21 | 0.20 | 0.21 | 0.21 | 82.74 | 1.05 | 0.63 | 1.22 |
| G224 | 223 | 223 | 223 | 0.13 | 0.13 | 0.13 | 0.13 | 88.77 | 0.62 | 0.14 | 0.64 |
| G256 | 255 | 255 | 255 | 0.06 | 0.06 | 0.07 | 0.07 | 94.32 | 0.27 | 0.43 | 0.51 |

FIG.13

THREE-DIMENSIONAL MODELING APPARATUS, CONTROL APPARATUS, CONTROL METHOD, AND THREE-DIMENSIONAL OBJECT

CROSS REFERENCES TO RELATED APPLICATIONS

The present application claims priority to Japanese Priority Patent Application JP 2009-044097 filed in the Japan Patent Office on Feb. 26, 2009, the entire content of which is hereby incorporated by reference.

BACKGROUND

The present application relates to a three-dimensional modeling apparatus that forms a three-dimensional shape by laminating pieces of data of cross sections, a control apparatus and a control method therefor, and a three-dimensional object formed with the three-dimensional modeling apparatus.

In the past, a three-dimensional modeling apparatus of this type has been known as an apparatus of rapid prototyping, which is widespread for professional use. As main methods for the three-dimensional modeling apparatus, used are stereo-lithography, laminated object manufacturing, and modeling with powders, for example.

The stereo-lithography refers to a method of irradiating a light curing resin with a high-power laser, forming cross sections thereof, and creating a three-dimensional shape by laminating the cross sections. The laminated object manufacturing refers to a method of cutting thin sheets off in a layered manner and bonding and laminating the sheets, thereby creating a three-dimensional shape. The modeling with powders refers to a method of bedding powder materials in a layered manner, forming cross sections, and creating a three-dimensional shape by laminating the cross sections.

Further, the modeling with powders is roughly classified into two methods, i.e., a method of fusing or sintering powders and a method of solidifying powders by using adhesive. In the latter method, the adhesive is ejected to powders mainly containing gypsum by using an inkjet head used for a printer or the like to solidify the powders, and forming and laminating cross-sectional layers, thereby creating a three-dimensional shape.

In the modeling with powders with the use of an inkjet head, a head of an inkjet printer ejects a binder solution for binding the powders while moving on a sheet on which gypsum powders are bedded as if printing is performed. In this method, a high-power laser is not used unlike the stereo-lithography, and therefore an apparatus is easily handled. In addition, a light curing resin is not used, and therefore a burden on an environment is relatively small, and a troublesome task such as the management of a resin is less necessary (see, for example, Japanese Patent Translation Publication No. HEI07-507508 (p.p. 9, 10, etc. of the specification) (hereinafter, referred to as Patent Document 1)).

Incidentally, thanks to a recent great progress of an image processing technique, there has been proposed a method of processing a CT (computed tomography) image used for medical treatments in related art, which supports a pathological diagnosis by a doctor (see, for example, Japanese Patent Application Laid-open No. 2007-68844 (paragraph 0045 of the specification) (hereinafter, referred to as Patent Document 2)). Patent Document 2 discloses a technique of coloring an image of a part of, e.g., fat in a two-dimensional image of a subject to be tested, which is obtained by an X-ray CT.

SUMMARY

Recently, low-cost three-dimensional CADs penetrate a market, so the three-dimensional modeling apparatuses described above that are useful for embodying a model are used. In a case where the three-dimensional modeling apparatus uses three-dimensional CAD data, data forms of a solid form (there is a mass in a model) or a surface form (there is no mass in a model, that is, there is just an outline thereof) are used. Accordingly, data of the surface form does not include detailed information on the inside of the model, and therefore the model is defined based only on its outline data. In this case, the three-dimensional modeling apparatus creates a three-dimensional object obtained by adding a color or a texture to the surface data of the outline.

However, because information on the inside of the model is not reflected, the three-dimensional object gives an image different from the real thing in a case where the three-dimensional object is cut off, for example. To avoid this, it can be thought that entire pieces of data of the inside of the three-dimensional object are defined one by one. However, this operation requires enormous amounts of time and labors.

In view of the above-mentioned circumstances, it is desirable to provide a three-dimensional modeling apparatus capable of creating a three-dimensional object that gives an image close to the real thing, a control apparatus and a control method therefor, and a three-dimensional object created by the three-dimensional modeling apparatus.

According to an embodiment, there is provided a three-dimensional modeling apparatus including a stage, a head, an adjustment mechanism, an ejection command means, and a control means.

On the stage, a powder material is accumulated.

The head ejects ink to the powder material on the stage.

The adjustment mechanism adjusts a relative height of the stage and the head for each predetermined layer thickness so that a three-dimensional object is formed on the stage by the predetermined layer thickness.

The ejection command means causes ejection of the ink from the head so that the powder material is colored a plurality of colors respectively corresponding to multilevel luminance information items in a multivalued image, the multivalued image being obtained by performing a multivalued processing of a luminance with respect to data of a two-dimensional image that is a cross-sectional image of a modeling target object, the multivalued processing being an at least two-valued processing.

The control means controls the adjustment mechanism and the ejection command means so that the multivalued image is drawn for each layer thickness.

The ejection command means in the embodiment causes the ejection from the head to the powder material of the predetermined layer thicknesses so that the powder material is colored with the predetermined colors respectively corresponding to the plurality of luminance information items to draw the multivalued image. This operation is repeatedly performed for each multivalued image that constitutes a multivalued image group. As a result, the three-dimensional object, even inner side of which is colored, can be obtained, which can give an impression close to the real thing to a person who treats the three-dimensional object.

The multivalued processing refers to a processing including a two-valued processing using one threshold value, a three-valued processing using two gradual threshold values, or a four-or-more-valued processing.

One of the "plurality of colors" may be white or colorless. Color information to be colored only has to be set.

The head may be capable of ejecting liquid for hardening the powder material. In this case, the ejection command means controls an amount of the liquid ejected from the head to adjust a hardness of the three-dimensional object.

With this structure, it is possible to create a three-dimensional object having a desired hardness.

The ejection command means may cause the liquid to be ejected from the head by different amounts depending on areas in the three-dimensional object.

With this structure, it is possible to create a three-dimensional object having different hardnesses in at least two areas in the three-dimensional object.

The ejection command means may cause the ink to be ejected from the head so that the powder material is colored in accordance with an image created by coloring the multivalued image the plurality of colors respectively corresponding to the multilevel luminance information items.

As a processing means of coloring the multivalued image, a processing means operated by a person using a computer or an automatic processing means by a computer may be used.

In this case, the automatic processing by the computer is performed by using software programmed so that it is determined that which color is assigned to which luminance-level portion in the multivalued image. The assignment of the colors may be performed in a predetermined color order or at random. In addition, the assignment to the luminances as targets of the color assignment may be performed in accordance with the levels of the luminances or at random by the above-mentioned way of assigning the colors. The processing means may be operated by a person as described above, to perform the assignment of the colors to the luminances.

In this embodiment, the processing means is implemented by a computer provided separately from the three-dimensional modeling apparatus, but the three-dimensional modeling apparatus may include the processing means.

In a case where a lamination interval of cross-sectional images of the target object is larger than the predetermined layer thickness of the powder material, the ejection command means may cause the ink to be ejected in accordance with the multivalued image that is subjected to an interpolation processing so that an outline of the multivalued image corresponds to an outline obtained by laminating the cross-sectional images between the lamination interval.

With this structure, the outline of the target object can be reflected on the three-dimensional object with high accuracy.

The powder material may mainly contain sodium chloride. This structure is environmentally friendly, because the structure uses lower energy for extraction, process, or the like of the powder material as compared to a case where a material made of metal, plastic, or the like is used.

The target object may be an organism.

With this structure, it is possible to obtain, based on the cross-sectional image of the organism, e.g., a human body, a three-dimensional object of a part or whole of the human body. For example, in a case of the cross-sectional image group of the organism, the three-dimensional modeling apparatus is useful particularly in the medical field.

According to another embodiment, there is provided a control apparatus of a three-dimensional modeling apparatus including a stage on which a powder material is accumulated, a head to eject ink to the powder material on the stage, and an adjustment mechanism to adjust a relative height of the stage and the head for each predetermined layer thickness so that a three-dimensional object is formed on the stage by the predetermined layer thickness. The control apparatus includes an ejection command means and control means.

The ejection command means causes the ink to be ejected from the head so that the powder material is colored a plurality of colors respectively corresponding to multilevel luminance information items in a multivalued image, the multivalued image being obtained by performing a multivalued processing of a luminance with respect to data of a two-dimensional image that is a cross-sectional image of a modeling target object, the multivalued processing being an at least two-valued processing.

The control means controls the adjustment mechanism and the ejection command means so that the multivalued image is drawn for each layer thickness.

According to another embodiment, there is provided a control method of a three-dimensional modeling apparatus including a stage on which a powder material is accumulated, a head to eject ink to the powder material on the stage, and an adjustment mechanism to adjust a relative height of the stage and the head for each predetermined layer thickness so that a three-dimensional object is formed on the stage by the predetermined layer thickness.

The control method includes causing the ink to be ejected from the head so that the powder material is colored a plurality of colors respectively corresponding to multilevel luminance information items in a multivalued image, the multivalued image being obtained by performing a multivalued processing of a luminance with respect to data of a two-dimensional image that is a cross-sectional image of a modeling target object, the multivalued processing being an at least two-valued processing.

The control method further includes controlling the adjustment mechanism and the ejection of the ink from the head so that the multivalued image is drawn for each layer thickness.

According to another embodiment, there is provided a three-dimensional object obtained by a three-dimensional modeling apparatus including a stage, a head, an adjustment mechanism, an ejection command means, and a control means.

On the stage, a powder material is accumulated.

The head ejects ink to the powder material on the stage.

The adjustment mechanism adjusts a relative height of the stage and the head for each predetermined layer thickness so that a three-dimensional object is formed on the stage by the predetermined layer thickness.

The ejection command means causes the ink to be ejected from the head so that the powder material is colored a plurality of colors respectively corresponding to multilevel luminance information items in a multivalued image, the multivalued image being obtained by performing a multivalued processing of a luminance with respect to data of a two-dimensional image that is a cross-sectional image of a modeling target object, the multivalued processing being an at least two-valued processing.

The control means controls the adjustment mechanism and the ejection command means so that the multivalued image is drawn for each layer thickness.

As described above, according to the embodiments of the present invention, the three-dimensional object that gives an image close to the real think can be realized.

Additional features and advantages are described herein, and will be apparent from the following Detailed Description and the figures.

BRIEF DESCRIPTION OF THE FIGURES

FIG. 8 are diagrams for explaining a case where (entire or part of) a femur of a human body is set as a modeling-target object, and a 3-D object of the femur is created;

FIG. 12 are diagrams each showing an example of creating a 3-D object of a cervical spine and a surrounding area thereof for a simulation prior to a cervical spine implant;

FIG. 13 is a table indicating colors set in the 3-D modeling apparatus of the embodiment and measurement values of optical densities (grayscale) and the like of a sample of a 3-D object actually created;

DETAILED DESCRIPTION

The present application will be described with reference to the drawings according to an embodiment.

(Structure of Three-Dimensional Modeling Apparatus)

Figure 1:
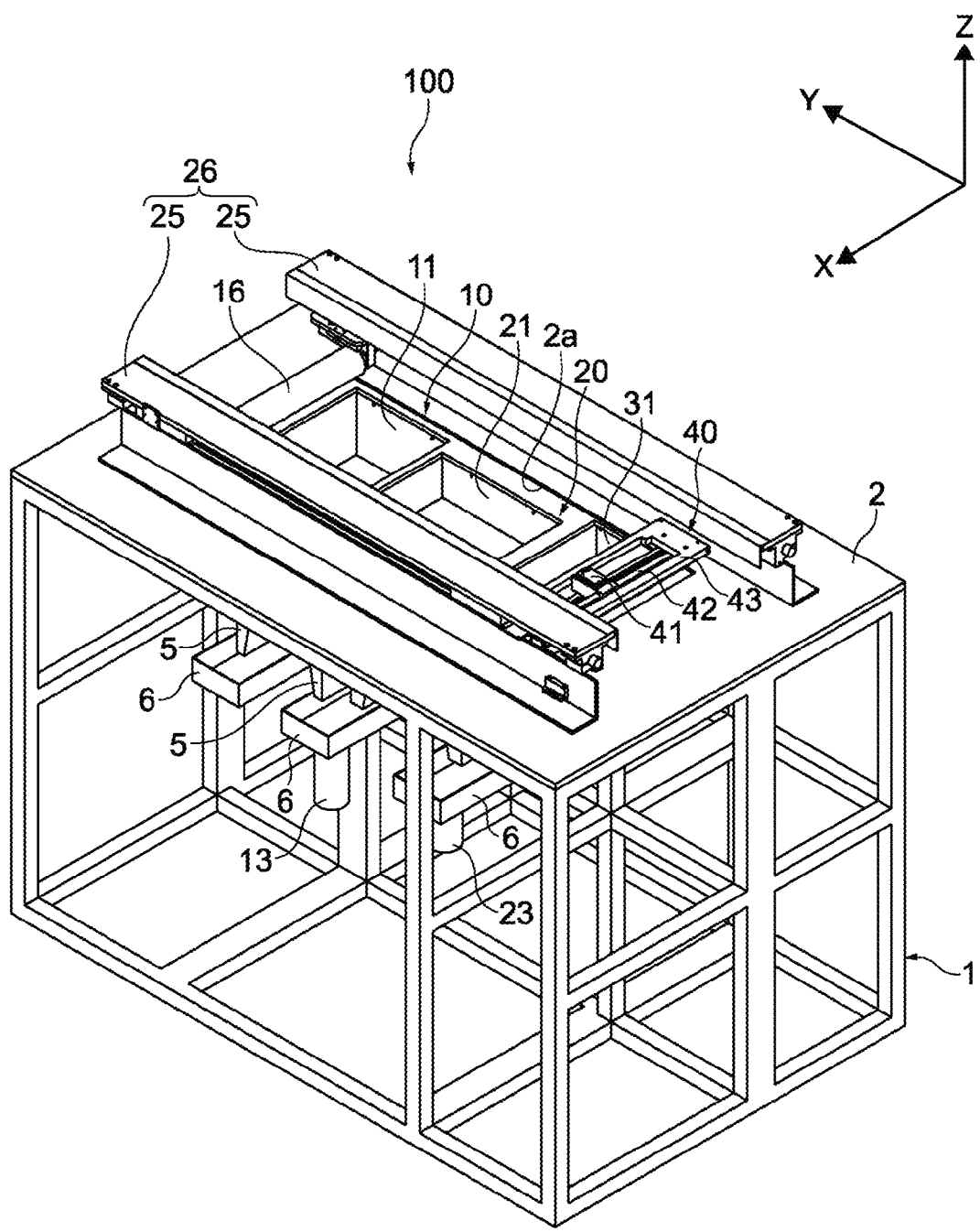
FIG. 1 is a perspective view showing a three-dimensional (3-D) modeling apparatus according to an embodiment.
Figure 2:
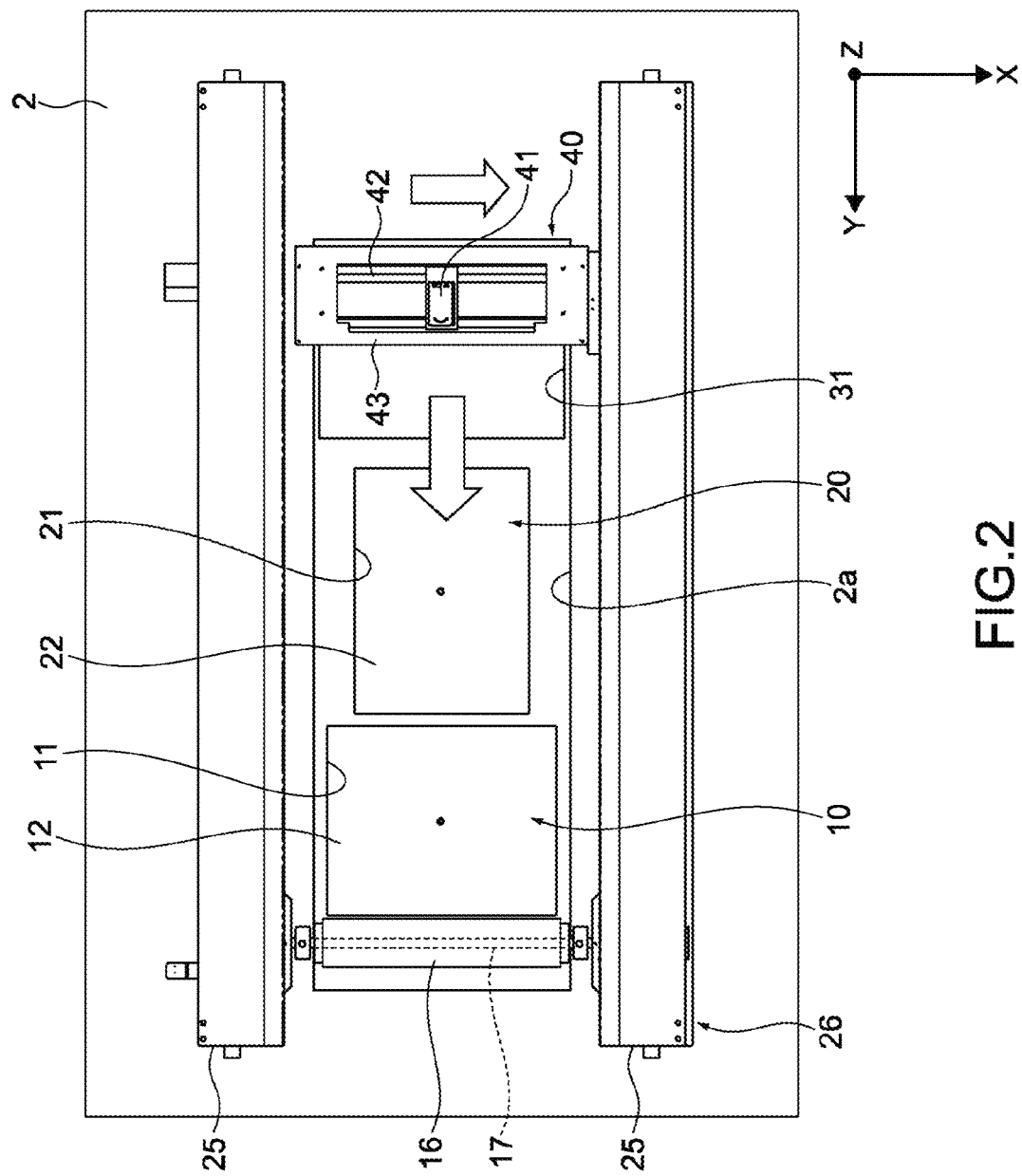
FIG. 2 is a plan view of the 3-D modeling apparatus shown in FIG. 1.
Figure 3:
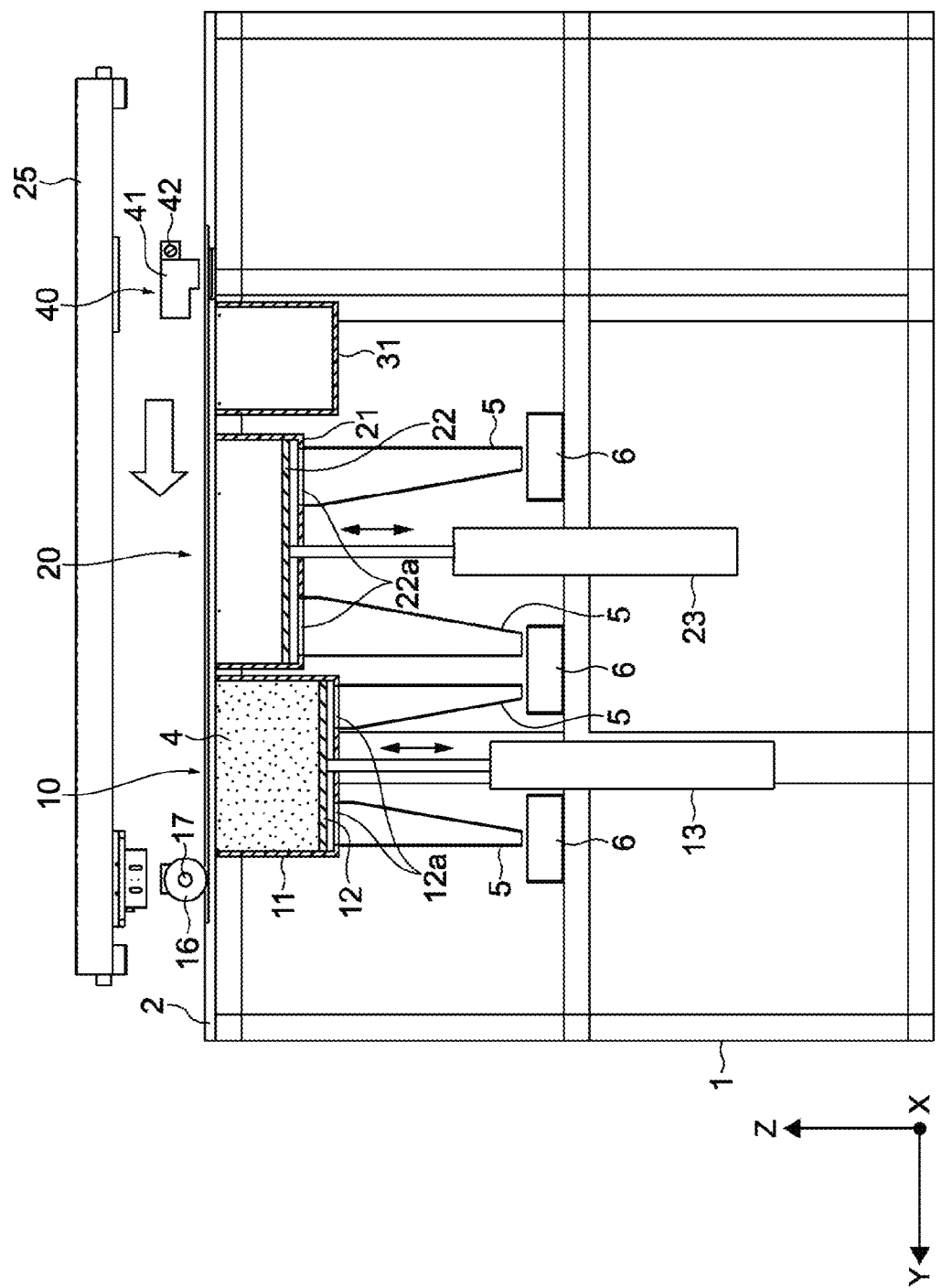
FIG. 3 is a side view of the 3-D modeling apparatus shown in FIG. 1.

FIG. 1 is a perspective view showing a three-dimensional (3-D) modeling apparatus 100 according to an embodiment. FIG. 2 is a plan view of the 3-D modeling apparatus 100 shown in FIG. 1, and FIG. 3 is a side view of the 3-D modeling apparatus 100 shown in FIG. 1.

The 3-D modeling apparatus 100 includes a frame 1 having a 3-D lattice shape and a plate 2 fixed on the frame 1. In a center portion of the plate 2, an opening portion 2a for modeling operation is formed in a Y direction that is a longitudinal direction of the plate 2. Below the opening portion 2a, a supply portion 10 of powder materials (hereinafter, simply referred to as powders) 4, a modeling portion 20 in which a 3-D object is formed of the powders 4, and a collection box 31 of the powders 4 are provided. As shown in FIGS. 2 and 3, the supply portion 10, the modeling portion 20, and the collection box 31 are arranged in the stated order in the Y direction from the left side of the figures.

The supply portion 10 is provided with a supply box 11, a supply stage 12, and a lifting/lowering cylinder 13. The supply box 11 is capable of storing the powders 4 therein. The supply stage 12 is disposed in the supply box 11 and supplies the powders 4 onto the plate 2 through the opening portion 2a by pushing up the powders 4 stored in the supply box 11. The lifting/lowering cylinder 13 lifts or lowers the supply stage 12.

As the powders 4, a water-soluble material, for example, an inorganic material such as salt, magnesium sulfate, magnesium chloride, potassium chloride, and sodium chloride. A mixture of sodium chloride with bittern components (magnesium sulfate, magnesium chloride, potassium chloride, or the like), that is, a material mainly containing sodium chloride may be used for the powders 4. Alternatively, an organic material such as polyvinylpyrrolidone, polyvinyl alcohol, carboxymethyl cellulose, ammonium polyacrylate, sodium polyacrylate, ammonium meta-acrylate, and sodium meta-acrylate, or a copolymer thereof may be used. An average particle diameter of the powders 4 is 10 µm or more and 100 µm or less. The use of the salt requires less energy for extracting or processing the powder material as compared to a case where metal or plastic is used for the powder material, and therefore is environmentally friendly.

The modeling portion 20 disposed so as to be adjacent to the supply portion 10 is provided with a modeling box 21, a modeling stage 22, and a lifting/lowering cylinder 23. The modeling box 21 is capable of storing the powders 4 therein. The modeling stage 22 is disposed in the modeling box 21 and supports from a bottom a 3-D object to be created. On the modeling stage 22, the powders 4 are accumulated. The lifting/lowering cylinder 23 lifts and lowers the modeling stage 22. The lifting/lowering cylinders 13 and 23 use a voice coil motor or a fluid pressure.

In FIG. 2, lengths of the modeling box 21 are set to 10 to 30 cm in an X direction and 20 to 50 cm in the Y direction but are not limited thereto.

On bottom surfaces of the supply box 11 and the modeling box 21, discharge ports 12a and 22a for discharging extra powders 4 are formed, respectively. To the discharge ports 12a and 22a, members 5 each of which forms a discharge path for the powders 4 are connected. Below the members 5, boxes 6 each of which collects the powders 4 discharged by self-weight through the members 5 that form the discharge paths are provided.

An upper surface of each of the boxes 11, 21, and 31 are opened. The opened surfaces of the boxes are opposed to the opening portion 2a of the plate 2.

In the vicinity of an end portion of the opening portion 2a of the plate 2 on a side of the supply portion 10, a roller 16 is provided. The roller 16 transfers the powders 4 supplied from the supply portion 10 to the modeling portion 20. The roller 16 has a rotation shaft 17 that is extended in a direction perpendicular to an arrangement direction of the boxes 11, 21, and 31 on a horizontal plane, that is, in the X direction. Further, on the plate 2, a movement mechanism 26 that moves the roller 16 in the Y direction.

Figure 6:
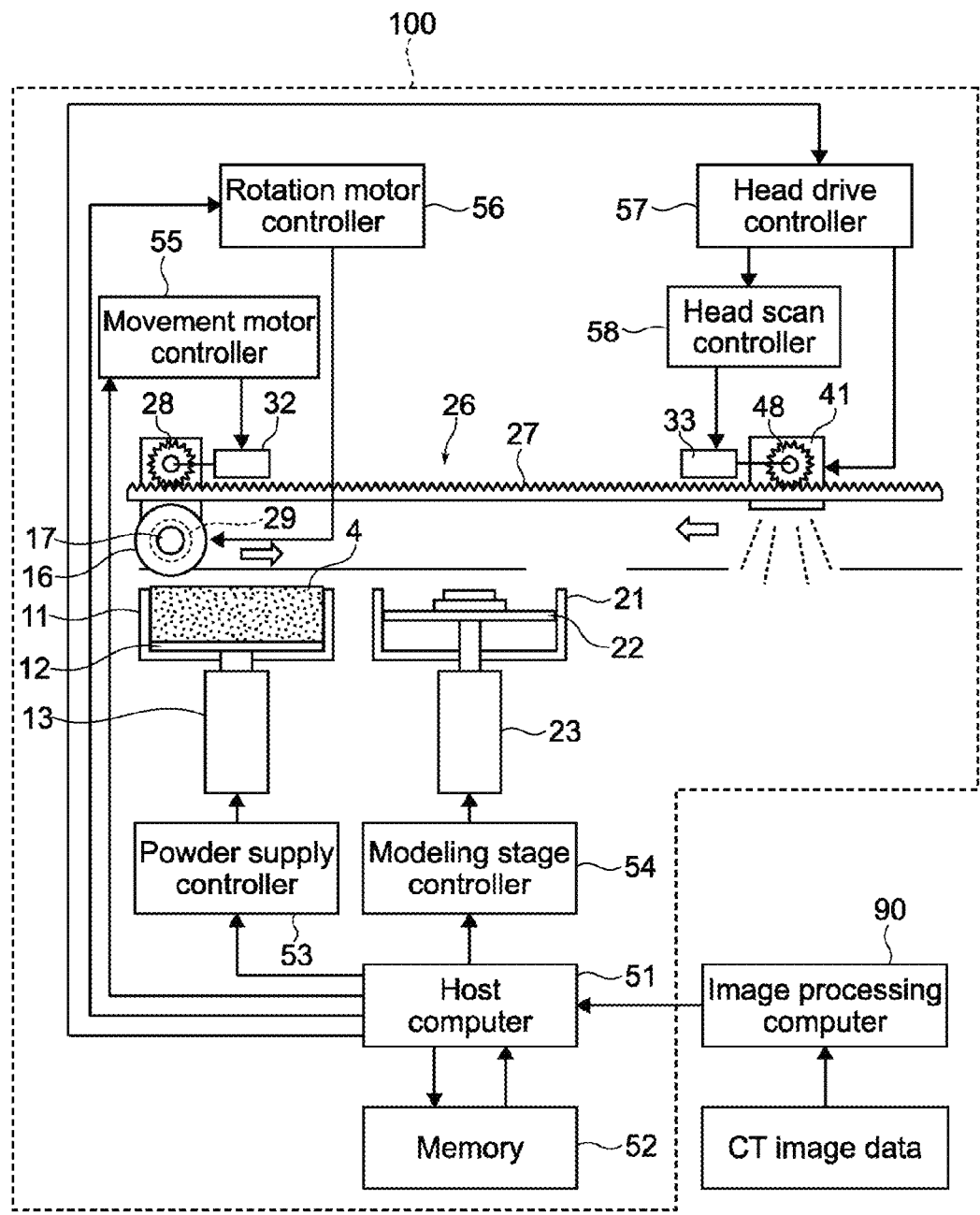
FIG. 6 is a block diagram mainly showing a control system of the 3-D modeling apparatus.

The movement mechanism 26 includes a pair of guide rails 25 and a drive mechanism. The guide rails 25 are respectively disposed on both sides of the opening portion 2a along the X direction, and are extended in the Y direction. The drive mechanism is disposed above the guide rails 25. For the drive mechanism, a drive mechanism formed of a rack and a pinion is used. In this case, as shown in FIG. 6, the drive mechanism includes a movement motor 32, a gear 28 driven by the movement motor 32, and a rack gear 27 that is engaged with the gear 28. The rack gear 27 is disposed on an appropriate position of the guide rail 25 or the plate 2.

Further, as shown in FIG. 6, the 3-D modeling apparatus 100 is provided with a rotation motor 29 for rotating the roller 16. To rotate the roller 16, a drive force of the movement motor 32 may be transmitted to the rotation shaft 17 of the roller 16 through a gear or the like (not shown).

The drive mechanism is not limited to the rack-and-pinion drive mechanism, and may be formed of a ball screw drive mechanism, a belt drive mechanism, a chain drive mechanism, or a linear motor drive mechanism that uses an electromagnetic force or an electrostatic force.

In addition, an inkjet head 41 is movably provided on the plate 2. The inkjet head 41 is capable of ejecting ink on the powders 4 on the modeling stage 22 of the modeling portion 20. The inkjet head 41 is mounted on a drive unit 40 connected to the movement mechanism 26, and the drive unit 40 can be moved in the Y direction by the movement mechanism 26. For example, as shown in FIG. 6, the drive unit 40 is moved in the Y direction by a Y-direction movement motor 33, a gear 48 driven by the Y-direction movement motor 33, and the rack gear 27. With this structure, the inkjet head 41 can perform a scanning movement on an X-Y plane above the opening portion 2a of the plate 2.

The drive unit 40 is provided with a movement body 43 and a ball screw 42 mounted on the movement body 43. The inkjet head 41 can be moved on the movement body 43 in the X direction by the ball screw 42. The drive unit 40 may be formed of another drive mechanism mentioned above instead of the ball screw drive mechanism.

Figure 4:
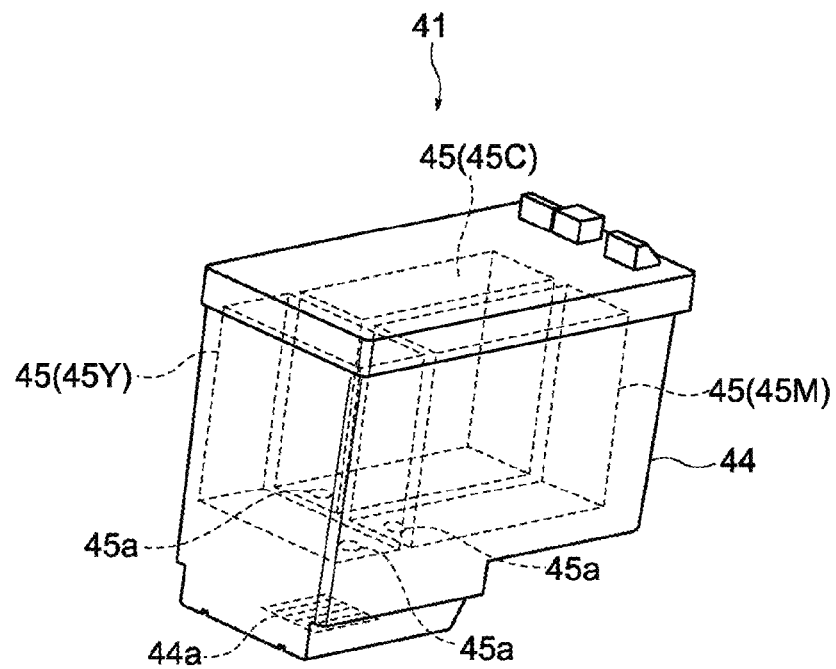
FIG. 4 is a perspective view showing the inkjet head according to the embodiment.

FIG. 4 is a perspective view showing the inkjet head 41 according to the embodiment.

The inkjet head 41 may be formed to have the same structure and function as an inkjet head for a general printer. For example, in a case 44 of the inkjet head 41, a plurality of ink tanks 45 is provided. The plurality of ink tanks 45 is constituted of ink tanks 45C, 45M, and 45Y that store ink of colors of cyan, magenta, and yellow (hereinafter, referred to as CMY), respectively. In this example, the cyan ink tank 45C and the magenta ink tank 45M are arranged in a predetermined direction, and the yellow ink tank 45Y is disposed on a side of one end portion of the cyan and magenta ink tanks 45C and 45M.

On lower portions of the ink tanks 45, discharge holes 45a that discharge the ink are formed, respectively. The discharge holes 45a are communicated with an ejection port 44a. The ejection port 44a is formed on a lower portion of the case 44 through an ink buffer chamber and an inkjet generation mechanism (which are not shown). As the inkjet generation mechanism, a piezoelectric type or a thermal type can be used.

Figure 5:
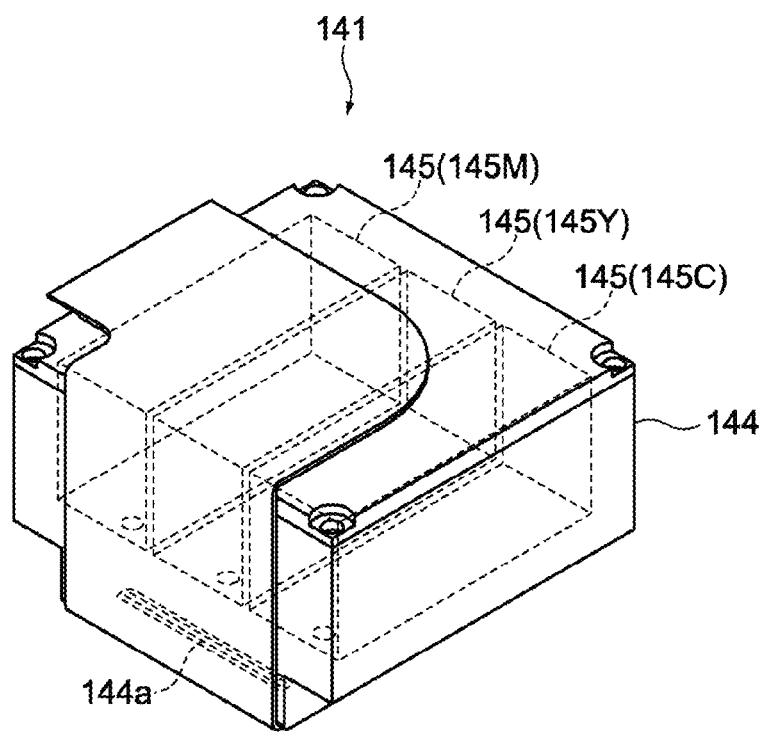
FIG. 5 is a perspective view showing an inkjet head according to another embodiment.

FIG. 5 is a perspective view showing an inkjet head according to another embodiment. In an inkjet head 141 shown in FIG. 5, in a case 144, a magenta ink tank 145M, a yellow ink tank 145Y, and a cyan ink tank 145C are arranged in a direction. Further, in a predetermined position of a bottom portion of the case 144, an ejection portion 144a for each ink is formed.

In the structures of the inkjet heads 41 and 141 shown in FIGS. 4 and 5, respectively, an ink tank for a black, white, or colorless ink may be provided in addition to the ink tanks of the three colors of CYM. In particular, the inkjet head having the ink tank of the black, white, or colorless ink may be provided depending on the color of the powders 4 as appropriate. In this embodiment, materials of the powders 4 and the ink are selected so that the powders 4 are hardened due to a water content in the ink, for example. In a case where the powders 4 are white and a 3-D object is intended to be white-colored (to be partly kept white), the colorless ink or the white ink is ejected to the part to be white-colored.

Further, for example, as the material of the ink, an aqueous ink is used, and a commercially available ink for an inkjet printer may also be used. Depending on the material of the powders 4, the ink may be an oil-based ink. As the colorless ink, a mixture of pure water and ethyl alcohol in a ratio by weight of 1:1, a mixture obtained by mixing glycerin into pure water by 20 wt %, or a mixture obtained by mixing a minute amount of surfactant into the above-mentioned mixture may be used.

FIG. 6 is a block diagram mainly showing a control system of the 3-D modeling apparatus 100.

The control system includes a host computer 51 (control means), a memory 52, an image processing computer 90, a powder supply controller 53, a modeling stage controller 54, a rotation motor controller 56, a movement motor controller 55, a head drive controller 57, and a head scan controller 58.

The host computer 51 performs an overall control on the drives of the memory 52 and the various controllers. The memory 52 is connected to the host computer 51 and may be volatile or non-volatile.

The image processing computer 90 loads CT (computed tomography) image data as a 2-D image of a modeling-target object as will be described later, and performs image processings such as conversion of the CT image data into a BMP (bitmap) format. Typically, the image processing computer 90 is provided separately from the 3-D modeling apparatus 100 and connected to the host computer 51 via a USB (universal serial bus), and transmits, to the host computer 51, stored image data on which the image processing has been performed.

The form of the connection between the host computer 51 and the image processing computer 90 is not limited to the USB but may be an SCSI (small computer system interface) or another form. In addition, it makes no difference whether a wired connection or a wireless connection is used. It should be noted that the image processing computer 90 may be a device for image processings that is mounted on the 3-D modeling apparatus 100. Further, in the case where the image processing computer 90 is separated from the 3-D modeling apparatus 100, the image processing computer 90 may be a CT apparatus.

The powder supply controller 53 controls a drive amount of lifting/lowering of the lifting/lowering cylinder 13, in order to control a drive of the lifting or lowering of the supply stage 12 to thereby control the amount of the powders 4 accumulated on the plate 2 through the opening portion 2a of the plate 2.

The modeling stage controller 54 controls the lifting/lowering drive amount of the lifting/lowering cylinder 13, in order to lowering the modeling stage 22 on a predetermined-height basis (as will be described later) at a time of printing on the powders 4 by the inkjet head 41.

The head drive controller 57 outputs, to the head scan controller 58, a drive signal in the X-Y plane of the head. In addition, the head drive controller 57 outputs a drive signal to the inkjet generation mechanism in the inkjet head 41 in order to control the ejection amount of each ink.

The head scan controller 58 controls a drive of a motor for driving the ball screw drive mechanism in the X direction. The motor is mounted on the Y-direction movement motor 33 and the drive unit 40.

The host computer 51, the image processing computer 90, the modeling stage controller 54, the powder supply controller 53, the rotation motor controller 56, the movement motor controller 55, the head drive controller 57, and the head scan controller 58 may be implemented by the following hardware or combinations of the hardware and software. Examples of the hardware include a CPU (central processing unit), a DSP (digital signal processor), an FPGA (field programmable gate array), an ASIC (application specific integrated circuit), or similar hardware to those.

The memory 52 may be a solid-state memory (semiconductor, dielectric, or magneto-resistive memory) or a storage device such as a magnetic disc and an optical disc.

(Operation of 3-D Modeling Apparatus)

Figure 7:
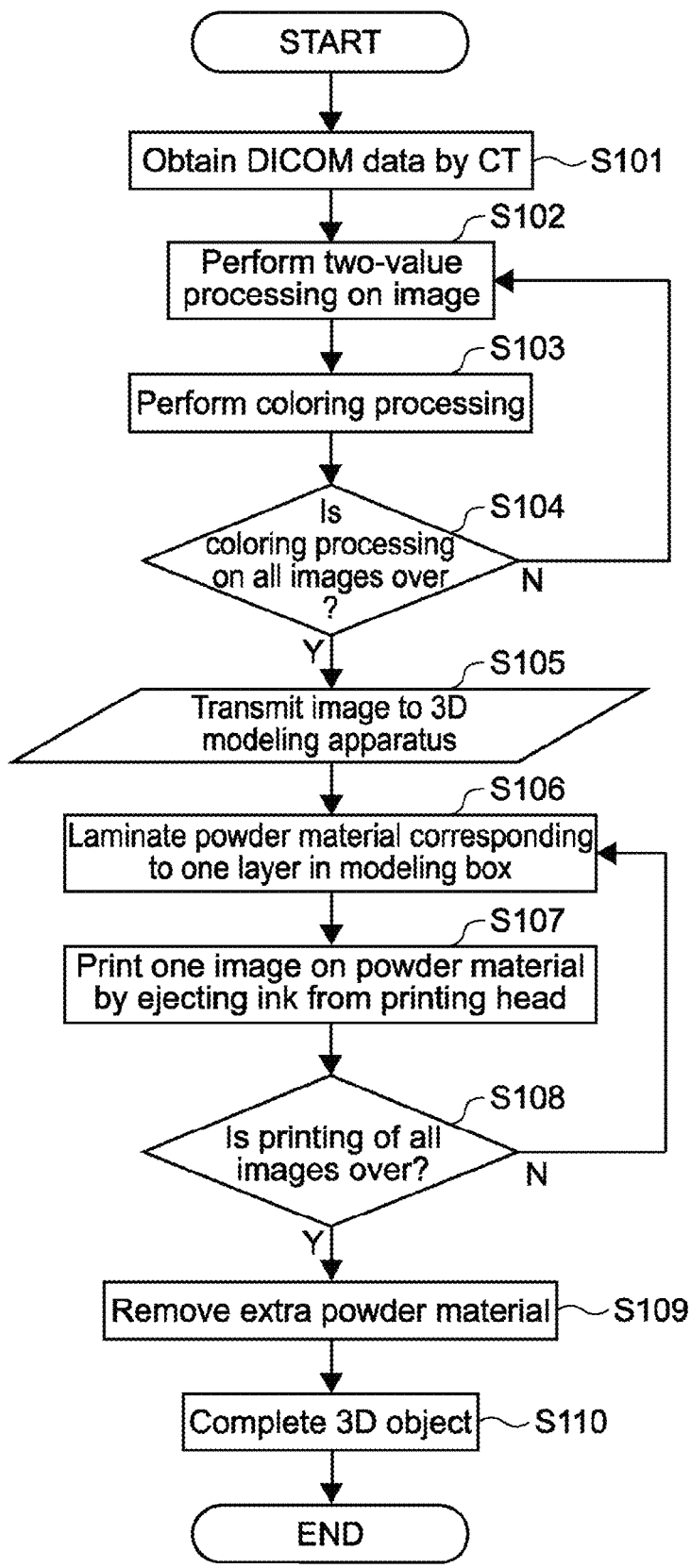
FIG. 7 is a flowchart showing an operation of the 3-D modeling apparatus (and an image processing computer)

A description will be given on an operation of the 3-D modeling apparatus 100 (and the image processing computer 90) structured as described above. FIG. 7 is a flowchart showing the operation.

In Step 101, the image processing computer 90 reads CT image data, for example. The CT image data is generally treated as DICOM (digital imaging and communication in medicine) data in the medical field.

The CT is not limited to a CT using an X ray and refers to a broad CT including a SPECT (single photon emission CT), a PET (positron emission tomography), an MM (magnetic resonance imaging), and the like.

Here, with reference to FIGS. 8A to 8D, a description will be given on a case where (entire or part of) a femur of a human body is set as a modeling-target object and a case where a 3-D object of the femur is created. FIG. 8A shows a piece of DICOM data of a predetermined portion of the femur. A plurality of pieces of DICOM data that is cross-sectional image data of the target object is prepared at intervals of 1 mm. The plurality of pieces of DICOM data is stored as a CT image data group corresponding to one target object in the memory 52 in the image processing computer 90. The pieces of DICOM data are generally a JPEG (joint photographic expert group) format.

In Step 102, the image processing computer 90 performs a multiple value processing on a luminance of the DICOM data stored. The multivalued processing includes a two-valued processing based on a threshold value of the luminance, a three-valued processing based on two stepwise threshold values, or a four (or more)-valued processing.

After the multivalued processing in Step 102, as shown in FIG. 8B, based on luminance information items of the degrees corresponding to the multiple values, the image processing computer 90 creates an image colored a plurality of colors corresponding to the luminance information items of the various degrees in Step 103. As shown in FIG. 8A, for example, a bright portion on an outer side of the bone corresponds to a part in which a bone density is higher than a less bright portion on an inner side of the bone. For example, as shown in FIG. 8B, in an image obtained by the multivalued processing, the outer side part having higher bone density is colored yellow or blue, and the inner side part is colored red. The colors corresponding to the respective luminance information items are not limited. It should be noted that the multivalued image colored is generally created in the BMP format but may be created in another format.

As ways of coloring the multivalued image, a processing by a person by using the image processing computer 90 or an automatic processing by the image processing computer 90 may be performed.

The automatic processing by the image processing computer 90 in this case is performed by processing software in which assignment of the colors to the various luminance parts in the multivalued image is programmed based on preset information of the plurality of colors. The assignment of the colors may be performed in a predetermined order of colors or at random. In addition, the assignment of the colors to the luminances may be performed based on the degrees of the luminances or at random by using the method of the assignment of the colors.

The processing of the assignment of the colors and/or the assignment to the luminances mentioned above may be performed by the person.

After the multivalued image is colored, in Step 104, the image processing computer 90 confirms whether the coloring processing is completely performed for the one target object. When the coloring processing is over, in Step 105, the image processing computer 90 outputs the multivalued image data group colored to the host computer 51, and the host computer 51 stores the data group in the memory 52.

It should be noted that the DICOM data and the multivalued image data are shown as the images visualized on a monitor (not shown) or the like as shown in FIGS. 8A and 8B to make the data more easily understood, but the image data items do not have to be displayed on the monitor. However, the image processing computer 90 may display the multivalued image on the monitor so that the multivalued image created based on the DICOM data or the like can be visually confirmed by an operator (doctor, etc.).

Here, the number of pieces of multivalued image data colored may be the same as the number of pieces of DICOM data that constitute the one target object or may be different therefrom. As described above, the DICOM data items as the cross-sectional images are read at the intervals of 1 mm. The multivalued images to be formed on powder layers may also be formed at the intervals of 1 mm or may be formed at smaller (or larger) intervals than 1 mm.

FIGS. 9A to 9D are schematic diagrams sequentially showing mechanical operations of the 3-D modeling apparatus 100 in Step 106 and subsequent steps. FIGS. 9A to 9D shows a process in which a layer (predetermined number of layers) obtained by hardening the powders 4 by ejecting the ink is formed, as will be described later. The powders 4 and powders 4 to be hardened are indicated by a dotted area, and a hardened layer is indicated by a blackened area.

Figure 9A:
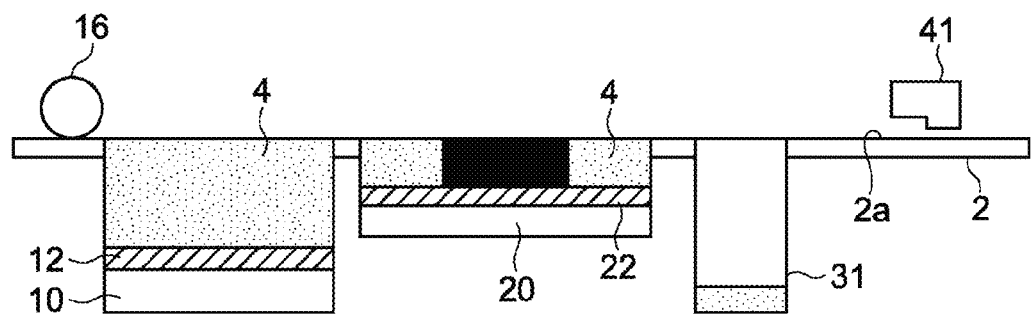
FIG. 9 are schematic diagrams sequentially showing mechanical operations of the 3-D modeling apparatus in Step 106 and subsequent steps.

As shown in FIG. 9A, on the modeling stage 22 of the modeling portion 20, the hardened layer and the powder layer to be hardened are laminated. In this state, a process of forming one hardened layer is started. In FIG. 9A, the position of the roller 16 and the position of the inkjet head 41 are set as standby positions.

Figure 9B:
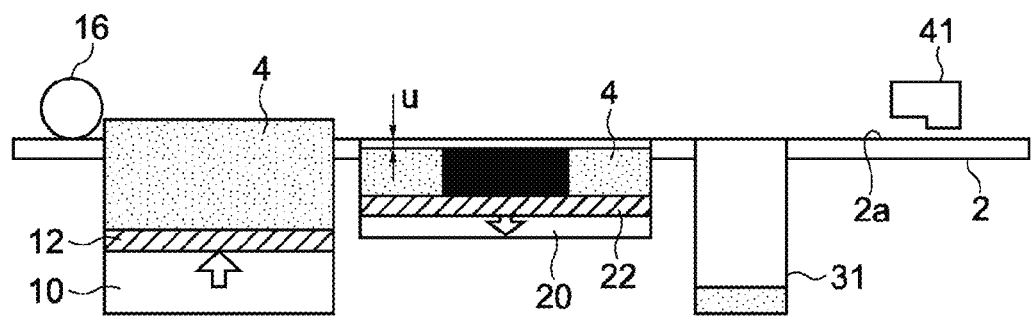

First, as shown in FIG. 9B, the powders 4 accumulated on the supply stage 12 of the supply portion 10 are lifted by the lifting/lowering cylinder 13, and the powders 4, the amount of which is slightly larger than that of one powder layer, are supplied to a level higher than the opening portion 2a of the plate 2. Further, in the modeling portion 20, the modeling stage 22 is lowered, thereby forming a gap between an upper surface of the hardened layer and the powder layers to be hardened and the opening portion 2a of the plate 2 by a thickness of the one powder layer (hardened layer). In this case, the modeling stage controller 54 and the lifting/lowering cylinder 13 each function as an adjustment mechanism.

In FIG. 9B, a thickness u corresponding to the thickness of the one powder layer is typically set to one tenth of 1-mm interval of DICOM data, i.e., 0.1 mm, but may be set to be more than 1 mm or less than 0.1 mm. A method of creating the multivalued image data in a case where the thickness of the one powder layer is less than the interval of the DICOM data will be described later.

Figure 9C:
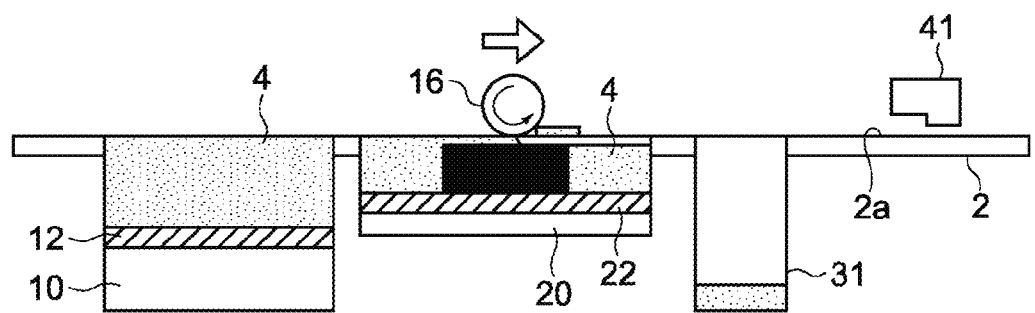

As shown in FIG. 9C, the roller 16 is rotated counterclockwise and moved in a direction indicated by the white arrow of FIG. 9C, thereby transferring the powders 4 supplied from the supply portion 10. Here, the rotation direction of the roller 16 corresponds to a direction reverse to a direction in which the roller 16 is expected to be rotated due to a friction caused between the roller 16 and the modeling portion 20 at a time when the roller 16 is rotatably moved (in a state where there is no rotation force applied to the rotation shaft of the roller 16) in the direction of the white arrow. The rotation of the roller 16 transfers the powders 4 and fills, with the powders 4, the space formed on the upper surface of the hardened layer and the powder layer to be hardened, thereby leveling and forming the powder layer (Step 107).

Figure 9D:
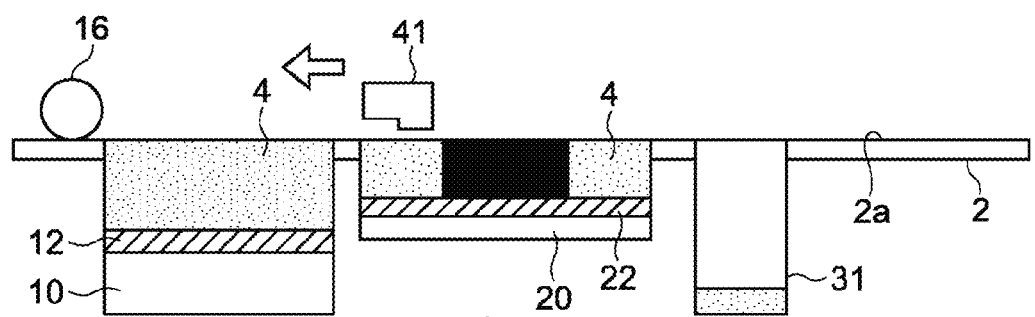

As shown in FIG. 9D, in conjunction with the operation of the roller 16 of passing the modeling portion 20, discharging the extra powders 4 to the collection box 31, and returning to the standby position, the inkjet head 41 ejects the ink so as to draw the colored multivalued image while moving. In this case, the host computer 51, the head drive controller 57, and the like each function as an ejection command means. The aqueous ink permeates the powder layer, and the part of the powders 4 to which the ink is ejected are bound to each other, thereby forming the hardened layer.

It should be noted that, after the roller 16 transfers the powders 4 and returns to the standby position, the head drive controller 57 may start to move the inkjet head 41 and cause it to start the ejection of the ink. However, by overlapping the time period of the returning operation of the roller 16 with the time period of the moving operation of the inkjet head 41, the process time period can be reduced.

In FIG. 9D, the head drive controller 57 causes the ejection of the color ink so that the colored image corresponding to the multivalued image as shown in FIG. 8B is drawn on the powder layer. Of course, in addition to the CMY colors, white and black colors may be included. In addition, in the case of the two-valued image, only the white and block colors may be used. Alternatively, in the case where the two-valued image is used, and the color of the powders 4 is white as described above, only the colorless ink and another color ink may be used.

When the inkjet head 41 is returned to the standby position, the state shown in FIG. 9A is obtained again, a part of the 3-D object corresponding to the colored multivalued image of one layer is formed (see, for example, FIG. 8C). Then, by performing the operations shown in FIGS. 9B and 9C, the multivalued image of the next layer is drawn on the powders 4, and the hardened layer is laminated.

In this way, based on the control performed by the host computer 51 and the various controllers, the multivalued image is drawn on the powders 4 by the predetermined layer thickness of the powders 4, thereby gradually laminating the hardened layers. Then, it is judged whether the printing of all the images of the target object is completed (Step 108). At the time of completion, the 3-D object is coated with the powder layer that is not hardened, and the extra powders 4 in the modeling box 21 are removed (Step 109). Subsequently, the 3-D object is taken out by a person or a robot (not shown) (Step 110). As a result, the 3-D object having two or more colors on an outer surface and on an inner side thereof can be formed (see, for example, FIG. 8D).

After the 3-D object is taken out, a heating apparatus (not shown) provided separately from the 3-D modeling apparatus 100 may heat the 3-D object, thereby increasing hardness of the 3-D object.

As described above, in this embodiment, in order to draw the multivalued image, the inkjet head is caused to eject the ink to the powder material by the predetermined layer thickness, to color the powders 4 the plurality of colors corresponding to the plurality of luminance information items. As a result, the 3-D object even the inner side of which is colored can be obtained. Thus, a person who handles the 3-D object can easily grasp even the inner condition thereof, and an impression close to the real thing can be given.

There is a great advantage particularly in a case where the target of the 3-D object is an organism, specifically, a human body, and the 3-D modeling apparatus 100 is used in the medical field.

In the past, a doctor has to scan CT images one by one to judge whether a focus of disease exists or not. Although some doctors can structure a 3-D object including an internal condition in his/her mind based on the 2-D CT images, this operation requires experience and skill. That is, an accurate diagnosis based on the 2-D CT images requires time and labor.

Further, in the past, an attempt to synthesize a CT image data group by using a computer and observe a 3-D shape has been made. However, bulk data thereof slows operations, and therefore it is difficult for a user to handle the data.

Eventually, in both cases, a doctor has to make a diagnosis while viewing an image on a monitor. Even if the above-mentioned methods are tried to be used for a simulation of surgery, it is difficult to catch a sense of a real thing based only on the images. Therefore, those methods are rarely used in actuality.

In contrast, in this embodiment, a doctor can easily find out a focus of disease by, for example, cutting off a 3-D object at a desired position, which does not require the skill of structuring in a doctor's mind the 3-D shape including the internal condition.

Further, in this embodiment, as will be described later, because the inside of the 3-D object can also be colored, a doctor can easily grasp a position of each of blood vessels inside the structural body in a case where a complicated bone structural body is a modeling target object.

Furthermore, it is also possible to perform a medical simulation by using the 3-D object according to this embodiment. The 3-D object is useful for a simulation prior to surgery or as an educational material for interns, for example.

Next, regarding Steps 101 to 103 of FIG. 7, a description will be given on an example in which a 3-D object is created for performing a simulation prior to an implant in the medical field.

Figure 10A:
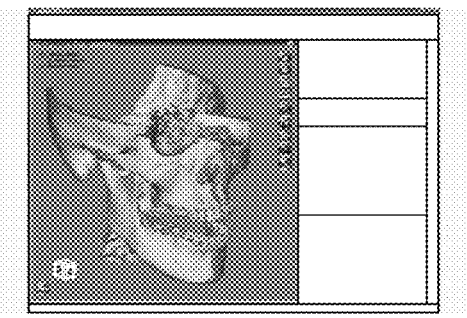
FIG. 10 are diagrams each showing an example of creating a 3-D object of a jawbone and a surrounding area thereof for a simulation prior to a dental implant.
Figure 10B:
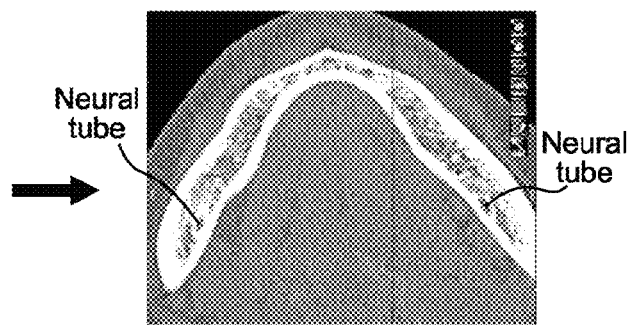
Figure 10C:
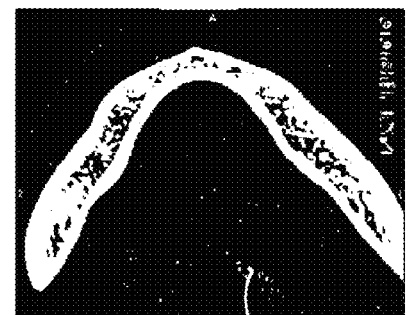

FIGS. 10A to 10E are diagrams each showing an example of creating a 3-D object of a jawbone and a surrounding area thereof for a simulation prior to a dental implant. FIG. 10A shows an example in which a 3-D image of a target object is structured based on a CT image group that constitutes a part (lower part) of a cranial bone as the target object by using commercially available software. FIG. 10B shows the DICOM data that is the CT image data. The image processing computer 90 performs, for example, the two-valued processing on the DICOM data as shown in FIG. 10C. As a result, an image in which a bone portion is emphasized can be obtained.

Figure 11:
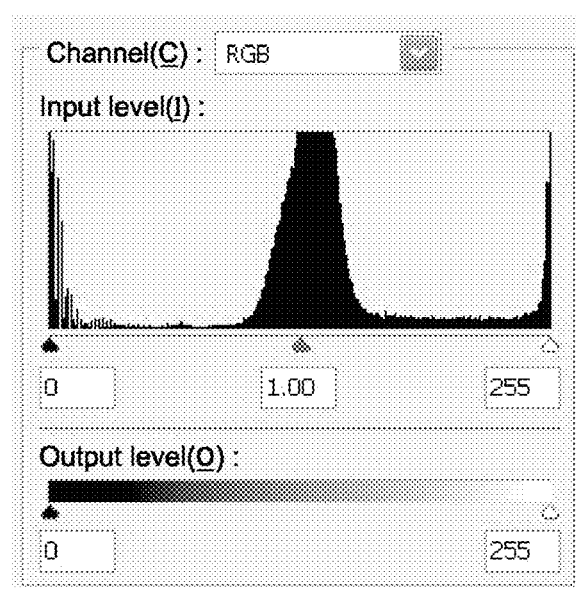
FIG. 11 is a diagram showing a histogram in DICOM data.

FIG. 11 is a diagram showing a histogram in the DICOM data. Based on the histogram, an operator sets a threshold value of a luminance for the two-valued processing, and the image processing computer 90 performs the two-valued processing based on the threshold value. As described above, the image processing computer 90 may automatically performs the two-valued processing based on the preset threshold value.

Figure 10E:
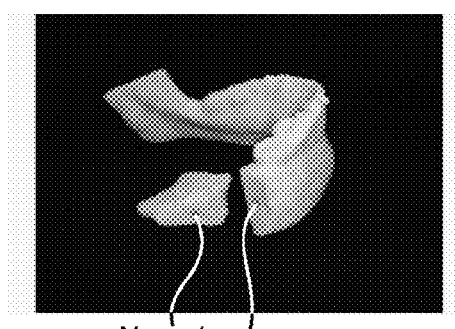
Figure 10D:
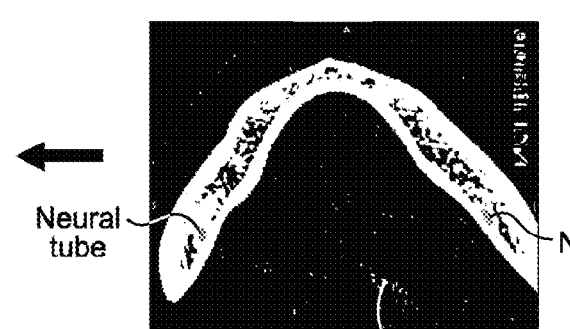

FIG. 10D is a diagram showing an example of an image in which neural tubes are colored red, for example. The image processing computer 90 has a database structured by storing a plurality of images of the jawbone of a human body, in which the positions of neural tubes are specified, and has software for specifying the positions of the neural tubes in the jawbone. Therefore, it is possible to color the neural tubes in the multivalued image. Of course, the coloring processing can be performed by a person. FIG. 10E is a diagram showing a 3-D image of a 3-D object formed in the 3-D modeling apparatus 100 based on the colored multivalued image group shown in FIG. 10D. From FIG. 10E, it can be found that there are the neural tubes (e.g., red color) in the jawbone. As shown in FIG. 10E, the host computer 51 or the image processing computer 90 may display the 3-D image of the 3-D object on a monitor.

It should be noted that as shown in FIGS. 10C and 10D, a noise portion outside the jawbone has only a minute volume. If the 3-D object is created by the 3-D modeling apparatus 100, almost no noise portion is reflected on the 3-D object, or only negligibly small noise portion is reflected thereon. In addition, for example, at the time when the image of FIG. 10C is obtained, the noise portion may be removed in advance by a known image processing technique.

FIGS. 12A to 12C are diagrams each showing an example of creating a 3-D object of a cervical spine and a surrounding area thereof for a simulation prior to a cervical spine implant. FIG. 12A shows an image that indicates a position of a cervical spine (for example, area surrounded by the square of FIG. 12A). FIG. 12B is a diagram showing a colored multivalued image. In this case, a position of aorta is colored red. FIG. 12C is a diagram showing a 3-D image of a 3-D object of the cervical spine, which is created by the 3-D modeling apparatus 100. In this case, it can be found that the red aorta is seen through the white cervical spine. In this way, according to this embodiment, the 3-D object that gives an impression close to the real thing to a viewer can be created.

FIG. 13 is a table indicating the colors set in the 3-D modeling apparatus 100 of this embodiment and measurement values of optical densities (grayscale) and the like of a sample of a 3-D object actually created. The 3-D object sample has a disc shape. For example, in a circumferential direction of a surface of the disc, the coloring is performed based on the set values of G1 to G256. The powder material is constituted of salt of 90 wt % or more, polyvinylpyrrolidone, and the like.

In the table shown in FIG. 13, nine colors of G1, G32, ..., G256 are shown in total, and RGB are indicated by the same grayscale value for each of the set colors. A darkest black of G1 has the RGB of (0, 0, 0), and a brightest white of G256 has the RGB of (255, 255, 255). This is the same set value as an output level in the histogram shown in FIG. 11, for example.

The optical density (OD) is expressed by the following expression:

OD=−log 10(I'/I)

where I represents an intensity of incident light to the 3-D object, and I' represents an intensity of reflection light from the 3-D object.

That is, in a case where a reflectance is 10%, OD=−log 10(0.1)=1 is obtained.

Figure 14:
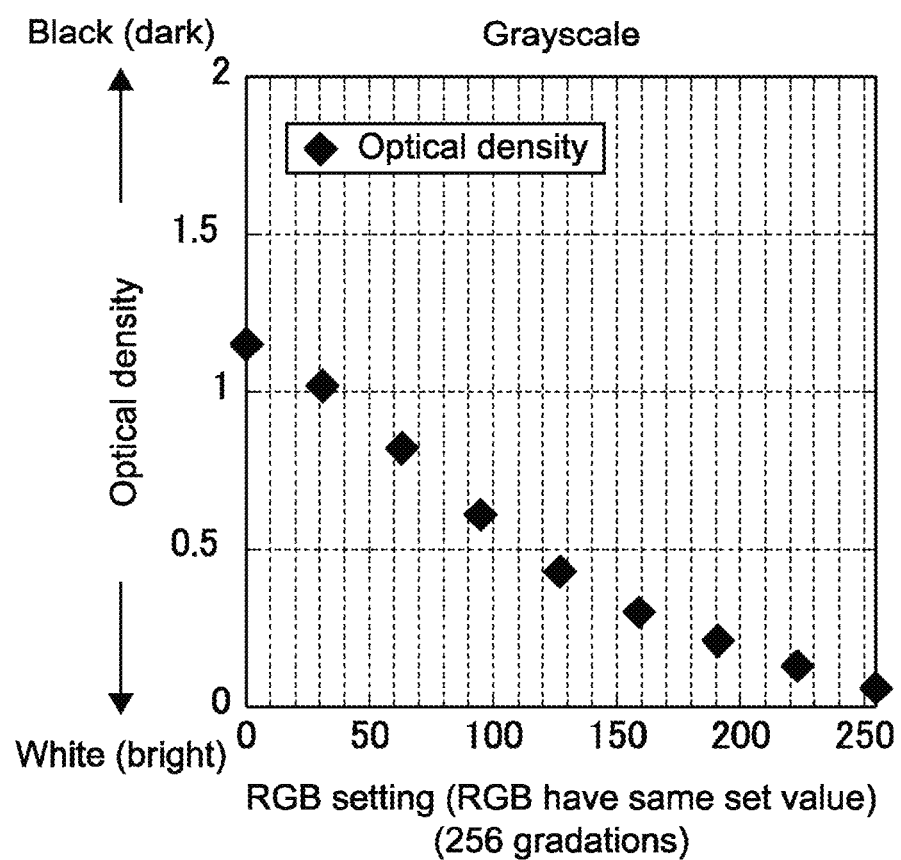
FIG. 14 is a graph showing values of the optical densities with respect to set values (horizontal axis) of RGB based on the table shown in FIG. 13.

FIG. 14 is a graph showing the values of the optical densities (ODs) with respect to the set values (horizontal axis) of the RGB based on the table shown in FIG. 13. The horizontal axis representing the set values of RGB indicates the grayscales in which RGB have the same values.

Figure 15:
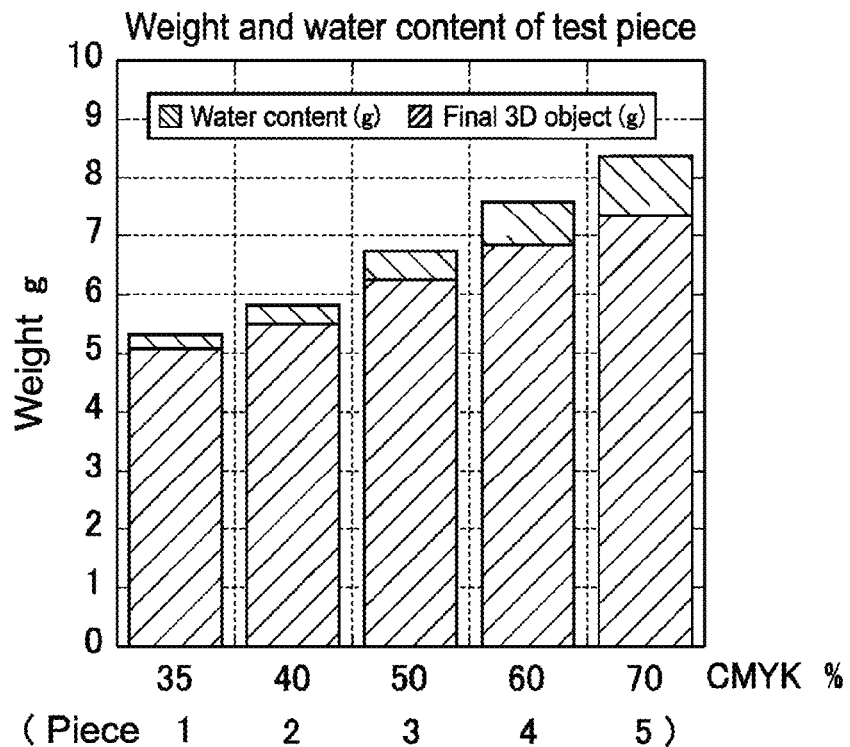
FIG. 15 is a graph showing measurement values respectively indicating weights of five 3-D objects (test pieces) that are formed by supplying ink of various quantities to five powder layers having the same weight.

FIG. 15 is a graph showing measurement values respectively indicating weights of five 3-D objects (test pieces) that are formed by supplying ink of various quantities to powder layers having the same weight. In this graph, a "final 3-D object" refers to a 3-D object whose ink water content is dried out by heating the object by a heating apparatus. As can be seen from the graph, the larger the water content, that is, the higher the density of an aqueous ink in a test piece, the heavier the final 3-D object becomes.

Figure 16:
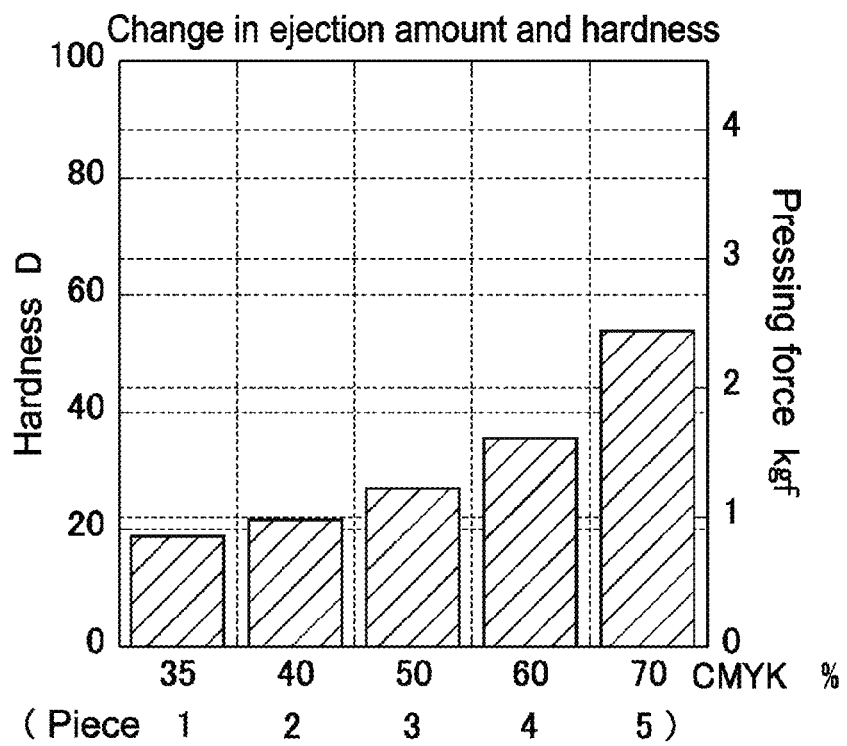
FIG. 16 is a graph showing measurement values of hardness of each of the five test pieces shown in FIG. 15.

FIG. 16 is a graph showing measurement values of hardness of each of the five test pieces shown in FIG. 15. A unit shown on the left side of the graph indicates the hardness at a time when the measurement is performed by a "durometer". The hardest degree is set to 100. A unit (kgf) shown on the right side of the graph indicates a pressing force applied to each of the test pieces at the time when the measurement by the durometer is performed. From the graph, the higher the density of the aqueous ink in the test piece, the higher the hardness becomes. Accordingly, a commercially available aqueous ink can serve as liquid for hardening the powder material. In addition, in some powder materials, water can serve as liquid for hardening the powder material in a case where the powders 4 is a copolymer with the organic material described above.

The graphs of FIGS. 15 and 16 reveal the following things. That is, to a test piece having a relatively low ink density out of the five test pieces, the colorless ink, for example, water (pure water or distilled water) is supplied and replenished, thereby making it possible to increase the hardness of the test piece to be substantially the same as that of the test piece having a relatively high ink density. Further, it is possible to intentionally set the hardness of the test piece to be different from another one. That is, by controlling the amount of the liquid ejected from the head, a 3-D object having a desired hardness can be created.

Based on the consideration described above, two embodiments in the following are implemented.

First, for example, in a 3-D object, a first area is colored at a first density, and a second area different from the first area is colored at a second density different from the first density. As a result, the 3-D object having different hardnesses in the different areas thereof can be obtained. For example, in a 3-D object whose target object is a part of a human body, a hardness of a bone portion can be set to be high, and a hardness of an organ portion, a vessel, or a neural tube can be set to be low. Alternatively, because the hardness is varied depending on areas of bones, the various hardnesses of the bones can be reflected to the 3-D object. As a result, when cutting off the 3-D object in a simulation, a medical worker can obtain the sense close to the real target object and can perform a practical simulation.

Second, it is possible to intentionally uniform the hardness of the entire 3-D object. In a case where the 3-D object has various colors and various ink densities depending on the areas thereof, by, for example, supplying a colorless ink such as water to an area having a low ink density by a predetermined amount, it is possible to set the hardness of the area having the low ink density to be substantially the same as that of the area having the high ink density.

Figure 17:
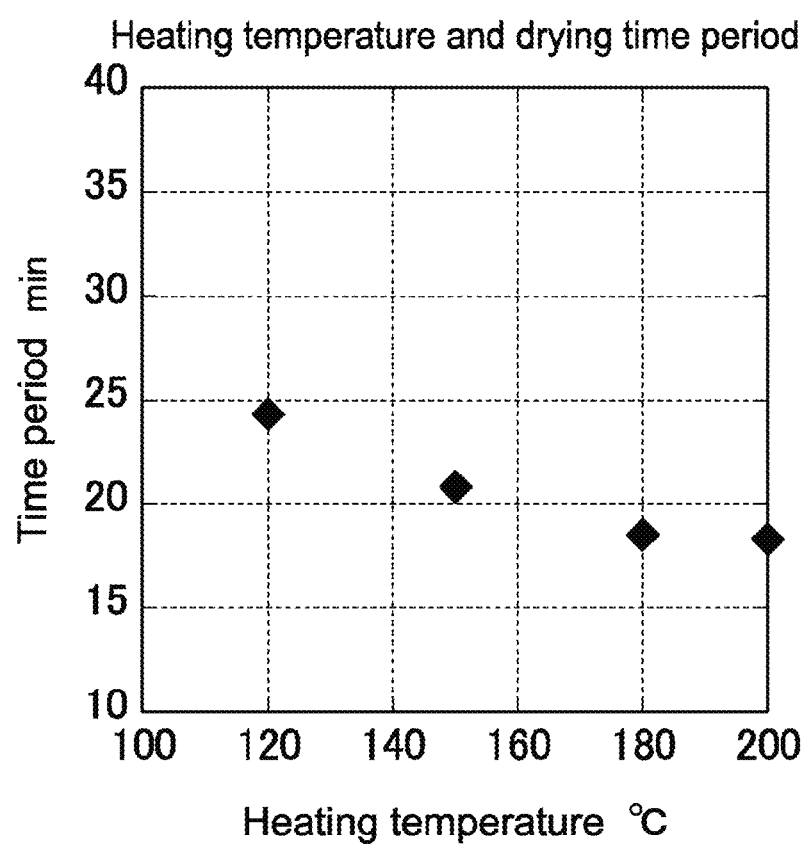
FIG. 17 is a graph showing a relationship between a heat temperature and a time period in a case where, after a 3-D object is formed by the 3-D modeling apparatus, a certain test piece is heated by a heating apparatus until a predetermined hardness is obtained.

FIG. 17 is a graph showing a relationship between a heat temperature and a time period in a case where, after a 3-D object is formed by the 3-D modeling apparatus 100, a certain test piece is heated by a heating apparatus until a predetermined hardness is obtained. In a case of high heating temperature, a heating time period required for obtaining the predetermined hardness can be reduced. When dried, the object is hardened and dried out, stopping a change in weight thereof. Therefore, by monitoring the change in weight of the object, it is possible to determine the end of the hardening, that is, the completion of the object.

Figure 18A:
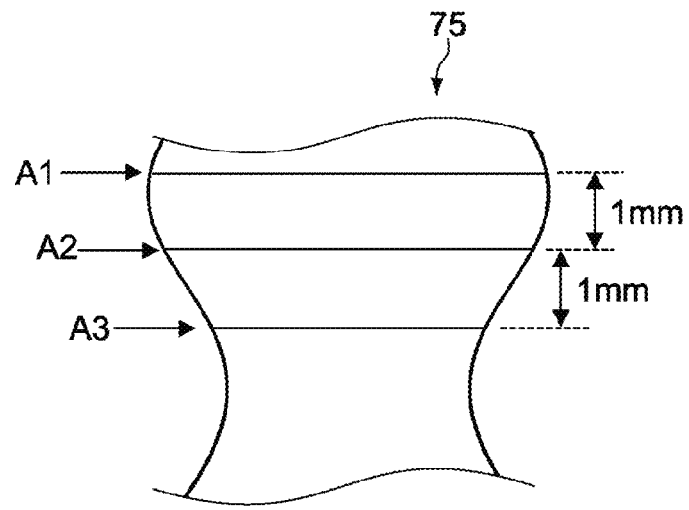
FIG. 18 are schematic diagrams each showing an outline of a part of a target object image when viewed in a direction vertical to cross-sectional planes.

Incidentally, the thickness of one powder layer is less than the intervals of the DICOM data, specifically, less than 0.1 mm. FIG. 18A is a schematic diagram showing an outline image of a part of a target object image. Planes of a target object 75 which are vertical to a plane of FIG. 18 are regarded as cut planes (cross sections) taken by each plane of DICOM data. That is, the solid lines A1, A2, and A3 in the image of the target object 75 indicate the cross sections. The outline image of the target object 75 may be a cross-sectional image obtained by the CT at a predetermined position in the target object 75.

Figure 18B:
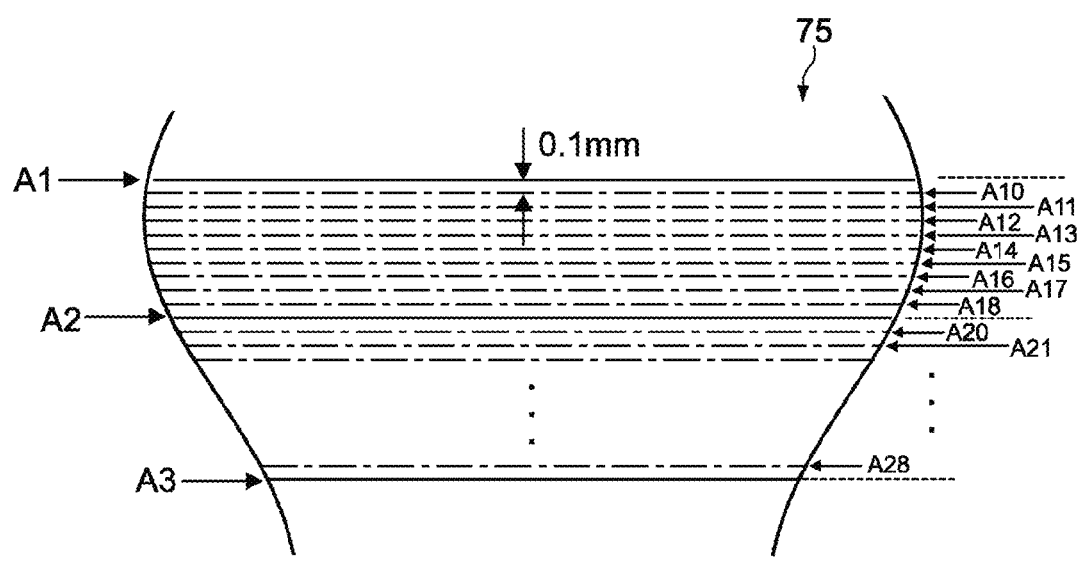

Here, the image processing computer 90 takes the outline image of the target object 75 shown in FIG. 18A. The image processing computer 90 interpolates so that the outline (outline in a plane vertical to the cross-sectional surface) of the target object 75 at a time when the multivalued images are laminated corresponds to an outline between the laminated layers (for example, between the lines A1 and A2) of the DICOM data. For example, as shown in FIG. 18B, the image processing computer 90 creates nine cross-sectional images (multivalued images) taken by cross-sectional lines A10, A11, ... A18 between the DICOM data items of the cross-sectional lines A1 and A2. Inner sides of the multivalued images taken by the nine cross-sectional lines A10, A11, ... A18 are the same as the inner side image of the multivalued image obtained from the DICOM data of the image A1. Further, inner sides of the multivalued images taken by nine cross-sectional images A20, A21 ... A28 are the same as the inner side image of the multivalued image obtained from the DICOM data of the image A2. Further, the image processing computer 90 creates nine multivalued images so that the outlines of the nine multivalued images laminated are matched with the outline of the target object 75 at the positions corresponding to the cross-sectional lines A10, A11 ... A18 of the taken outline image.

The 3-D modeling apparatus 100 may eject the ink for each multivalued image formed by the interpolation as described above, and laminates the powder layers (hardened layers) at the intervals of 0.1 mm, for example. As a result, the outline viewed in the plane vertical to the cross sections can be reflected to the 3-D object with high accuracy.

The present invention is not limited to the above embodiments, and various other embodiments can be considered.

In the above embodiments, in the modeling portion 20, the lifting/lowering cylinder 13 lifts or lowers the modeling stage 22. However, a structure in which the modeling stage 22 is fixed in position and the modeling box 21 or the inkjet head 41 is lifted or lowered may be used.

The inkjet head 41 may have a line-type head that is moved only in one direction at the time of the ejection of the ink or a plane-type head that is not moved at the time of the ejection of the ink. The plane-type head refers to a head that supports an ink ejection range corresponding to the range in which the 3-D object is formed in the modeling box 21, for example.

In the above embodiments, the example of the medical field is cited as a field in which the CT image data is used. In addition to the medical field, the 3-D modeling apparatus 100 may be applied to CT image data of an architectural field, a mechanical engineering field, and the like.

In the above embodiments, the multivalued image obtained based on the DICOM data is subjected to the coloring operation, and then the colored multivalued images are transmitted to the 3-D image apparatus. However, the multivalued image data that is not colored and obtained by the image processing computer 90 is taken by the 3-D image apparatus, and depending on the multivalued image data itself, the predetermined color ink may be ejected.

In the above embodiments, the image as the target of the multivalued processing is the DICOM format, but may be another format.

The final 3-D object described above is impregnated with a UV-curable resin, a polyester adhesive, a polyurethane adhesive, an epoxy adhesive, or a cyanoacrylate adhesive, with the result that the hardness of the final 3-D object can be increased. The final 3-D object into which the adhesive is impregnated can have markedly enhanced water resistance, heat resistance, and chemical resistance. Thus, the final 3-D object is useful particularly for the implant and the simulation of the surgery.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A three-dimensional modeling apparatus, comprising:
a stage on which a powder material is accumulated;
a supply portion for supplying the powder material;
a head to eject ink to the powder material on the stage;
a first adjustment mechanism to adjust a relative height of the stage and the head for each predetermined layer thickness so that a three-dimensional object is formed on the stage by the predetermined layer thickness;
a second adjustment mechanism to move a portion of the powder material from the supply portion above a substantially horizontal plane;
a movement mechanism to transfer the portion of the powder material from above the substantially horizontal plane to the stage;
an ejection command means for causing the ink to be ejected from the head so that the powder material is colored a plurality of colors respectively corresponding to multilevel luminance information items in a multivalued image, the multivalued image being obtained by performing a multivalued processing of a luminance with respect to data of a two-dimensional image that is a cross-sectional image of a modeling target object, the multivalued processing being an at least two-valued processing, the ejection command means also causing the ink to be ejected in a greater density on a top surface of a first area of the powder material for at least one predetermined layer thickness than on a top surface of an equivalent second area of the powder material for the at least one predetermined layer thickness so that the first and second areas of the at least one predetermined layer thickness have different hardnesses; and
a control means to control the adjustment mechanism and the ejection command means so that the multivalued image is drawn for each layer thickness.

2. The three-dimensional modeling apparatus according to claim 1,
wherein the ink includes liquid for hardening the powder material, and
wherein the ejection command means controls an amount of the liquid ejected from the head to adjust a hardness of the three-dimensional object.

3. The three-dimensional modeling apparatus according to claim 2,
wherein the ejection command means causes the liquid to be ejected from the head by different amounts depending on areas in the three-dimensional object.

4. The three-dimensional modeling apparatus according to claim 1,
wherein the ejection command means causes the ink to be ejected from the head so that the powder material is colored in accordance with an image created by coloring the multivalued image the plurality of colors respectively corresponding to the multilevel luminance information items.

5. The three-dimensional modeling apparatus according to claim 1,
wherein, in a case where a lamination interval of cross-sectional images of the target object is larger than the predetermined layer thickness of the powder material, the ejection command means causes the ink to be ejected in accordance with the multivalued image that is subjected to an interpolation processing so that an outline of the multivalued image corresponds to an outline obtained by laminating the cross-sectional images between the lamination interval.

6. The three-dimensional modeling apparatus according to claim 1,
wherein the powder material mainly contains sodium chloride.

7. The three-dimensional modeling apparatus according to claim 1,
wherein the target object is an organism.

8. A control apparatus of a three-dimensional modeling apparatus including a stage on which a powder material is accumulated, a supply portion for supplying the powder material, a head to eject ink to the powder material on the stage, a first adjustment mechanism to adjust a relative height of the stage and the head for each predetermined layer thickness so that a three-dimensional object is formed on the stage by the predetermined layer thickness, a second adjustment mechanism to move a portion of the powder material from the supply portion above a substantially horizontal plane, and a movement mechanism to transfer the portion of the powder material from above the substantially horizontal plane to the stage, the control apparatus comprising:
an ejection command means for causing the ink to be ejected from the head so that the powder material is colored a plurality of colors respectively corresponding to multilevel luminance information items in a multivalued image, the multivalued image being obtained by performing a multivalued processing of a luminance with respect to data of a two-dimensional image that is a cross-sectional image of a modeling target object, the multivalued processing being an at least two-valued processing, the ejection command means also causing the ink to be ejected in a greater density on a top surface of a first area of the powder material for at least one predetermined layer thickness than on a top surface of an equivalent second area of the powder material for the at least one predetermined layer thickness so that the first and second areas of the at least one predetermined layer thickness have different hardnesses; and
a control means to control the adjustment mechanism and the ejection command means so that the multivalued image is drawn for each layer thickness.

9. A control method of a three-dimensional modeling apparatus including a stage on which a powder material is accumulated, a supply portion for supplying the powder material, a head to eject ink to the powder material on the stage, a first adjustment mechanism to adjust a relative height of the stage and the head for each predetermined layer thickness so that a three-dimensional object is formed on the stage by the predetermined layer thickness, a second adjustment mechanism to move a portion of the powder material from the supply portion above a substantially horizontal plane, and a movement mechanism to transfer the portion of the powder material from above the substantially horizontal plane to the stage, the control method comprising:
causing the ink to be ejected from the head so that the powder material is colored a plurality of colors respectively corresponding to multilevel luminance information items in a multivalued image, the multivalued image being obtained by performing a multivalued processing of a luminance with respect to data of a two-dimensional image that is a cross-sectional image of a modeling target object, the multivalued processing being an at least two-valued processing;
causing the ink to be ejected in a greater density on a top surface of a first area of the powder material for at least one predetermined layer thickness than on a top surface of an equivalent second area of the powder material for the at least one predetermined layer thickness so that the first and second areas of the at least one predetermined layer thickness have different hardnesses; and
controlling the adjustment mechanism and the ejection of the ink from the head so that the multivalued image is drawn for each layer thickness.

10. A three-dimensional object obtained by a three-dimensional modeling apparatus including
a stage on which a powder material is accumulated,
a supply portion for supplying the powder material,
a head to eject ink to the powder material on the stage,
a first adjustment mechanism to adjust a relative height of the stage and the head for each predetermined layer thickness so that a three-dimensional object is formed on the stage by the predetermined layer thickness,
a second adjustment mechanism to move a portion of the powder material from the supply portion above a substantially horizontal plane,
a movement mechanism to transfer the portion of the powder material from above the substantially horizontal plane to the stage,
an ejection command means for causing the ink to be ejected from the head so that the powder material is colored a plurality of colors respectively corresponding to multilevel luminance information items in a multivalued image, the multivalued image being obtained by performing a multivalued processing of a luminance with respect to data of a two-dimensional image that is a cross-sectional image of a modeling target object, the multivalued processing being an at least two-valued processing, the ejection command means also causing the ink to be ejected in a greater density on a top surface of a first area of the powder material for at least one predetermined layer thickness than on a top surface of an equivalent second area of the powder material for the at least one predetermined layer thickness so that the first and second areas of the at least one predetermined layer thickness have different hardnesses, and
a control means to control the adjustment mechanism and the ejection command means so that the multivalued image is drawn for each layer thickness.

11. The three-dimensional modeling apparatus according to claim 1,
wherein the movement mechanism comprises a roller.

12. The control method according to claim 9,
wherein the movement mechanism comprises a roller.

13. The three-dimensional object according to claim 10,
wherein the movement mechanism comprises a roller.

14. The control method according to claim 9,
wherein the ink includes an aqueous ink having water in an amount to provide the greater density.

15. The control method according to claim 9,
wherein the ink includes a colorless ink including water.

16. The three-dimensional object according to claim 10,
wherein the ink includes an aqueous ink having water in an amount to provide the greater density.

17. The three-dimensional object according to claim 10,
wherein the ink includes a colorless ink including water.

18. The three-dimensional modeling apparatus according to claim 1,
wherein the ink includes an aqueous ink having water in an amount to provide the greater density.

19. The three-dimensional modeling apparatus according to claim 1,
wherein the ink includes a colorless ink including water.

20. The control apparatus according to claim 8,
wherein the movement mechanism comprises a roller.

21. The control apparatus according to claim 8,
wherein the ink includes an aqueous ink having water in an amount to provide the greater density.

22. The control apparatus according to claim 8,
wherein the ink includes a colorless ink including water.

23. A three-dimensional modeling apparatus, comprising:
a stage on which a powder material is accumulated;
a head to eject ink to the powder material on the stage;
an adjustment mechanism to adjust a relative height of the stage and the head for each predetermined layer thickness so that a three-dimensional object is formed on the stage by the predetermined layer thickness;
an ejection command means for causing the ink to be ejected from the head so that the powder material is colored a plurality of colors respectively corresponding to multilevel luminance information items in a multivalued image, the multivalued image being obtained by performing a multivalued processing of a luminance with respect to data of a two-dimensional image that is a cross-sectional image of a modeling target object, the multivalued processing being an at least two-valued processing, the ejection command means also causing the ink to be ejected in a greater density on a top surface of a first area of the powder material for at least one predetermined layer thickness than on a top surface of an equivalent second area of the powder material for the at least one predetermined layer thickness, so that the first and second areas of the at least one predetermined layer thickness have different hardnesses; and
a control means to control the adjustment mechanism and the ejection command means so that the multivalued image is drawn for each layer thickness.

24. The three-dimensional modeling apparatus according to claim 23,
wherein the ink includes an aqueous ink having water in an amount to provide the greater density.

25. The three-dimensional modeling apparatus according to claim 23,
wherein the ink includes a colorless ink including water.

26. The three-dimensional modeling apparatus according to claim 1,
wherein an upper surface of the supply portion defines the substantially horizontal plane.

27. The control apparatus according to claim 8,
wherein an upper surface of the supply portion defines the substantially horizontal plane.

28. The control method according to claim 9,
wherein an upper surface of the supply portion defines the substantially horizontal plane.

29. The three-dimensional object according to claim 10,
wherein an upper surface of the supply portion defines the substantially horizontal plane.

* * * * *